United States Patent
Nagy

(10) Patent No.: US 11,981,368 B2
(45) Date of Patent: May 14, 2024

(54) STEERING COLUMN FOR A MOTOR VEHICLE

(71) Applicants: thyssenkrupp Presta AG, Eschen (LI); thyssenkrupp AG, Essen (DE)

(72) Inventor: Balint Kalman Nagy, Montlingen (CH)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 17/795,463

(22) PCT Filed: Jan. 25, 2021

(86) PCT No.: PCT/EP2021/051545
§ 371 (c)(1),
(2) Date: Jul. 26, 2022

(87) PCT Pub. No.: WO2021/151807
PCT Pub. Date: Aug. 5, 2021

(65) Prior Publication Data
US 2023/0086912 A1   Mar. 23, 2023

(30) Foreign Application Priority Data

Jan. 29, 2020 (DE) ............ 10 2020 201 058.7

(51) Int. Cl.
*B62D 1/185* (2006.01)
*B62D 1/181* (2006.01)

(52) U.S. Cl.
CPC ............ *B62D 1/185* (2013.01); *B62D 1/181* (2013.01)

(58) Field of Classification Search
CPC ......... B62D 1/184; B62D 1/185; B62D 1/181
See application file for complete search history.

(56) References Cited

U.S. PATENT DOCUMENTS 4,418,582 A   12/1983   Martin
6,481,524 B1  11/2002   Ishida et al.
(Continued)

FOREIGN PATENT DOCUMENTS

BE   1029836 A1 *  5/2023
BE   1029838 A1 *  5/2023
(Continued)

OTHER PUBLICATIONS

English Translation of International Search Report issued in PCT/EP2021/051545, dated Apr. 20, 2021.

*Primary Examiner* — Nicole T Verley
(74) *Attorney, Agent, or Firm* — thyssenkrupp North America, LLC

(57) ABSTRACT

A steering column may include a casing tube in which a steering spindle is rotatably mounted, a guide unit that receives the casing unit so as to be telescopically adjustable in a direction of a longitudinal axis, and an electromotor adjustment drive that is arranged between the casing tube and the guide unit. An inner bearing face of the guide unit surrounds an outer casing surface of the casing tube and includes a slot extending longitudinally with a slot width between mutually opposing slot edges. A preload device engages the slot edges and is configured to apply a tightening force to reduce the slot width to preload the bearing face together with the casing surface. A clamping body cooperates with the slot edges via a deflection device that converts a reduction of slot width into a radial clamping movement of the clamping body for radial preloading the outer casing surface.

12 Claims, 3 Drawing Sheets

(56) References Cited

U.S. PATENT DOCUMENTS

| | | | |
|---|---|---|---|
| 2003/0209897 A1* | 11/2003 | Manwaring | B62D 1/184 |
| | | | 280/775 |
| 2008/0290641 A1 | 11/2008 | Galehr et al. | |
| 2009/0064814 A1 | 3/2009 | Tanaka | |
| 2009/0133954 A1 | 5/2009 | Pohl | |
| 2010/0300237 A1 | 12/2010 | Ridgway et al. | |
| 2012/0198956 A1* | 8/2012 | Takezawa | B62D 1/184 |
| | | | 74/493 |
| 2016/0252133 A1 | 9/2016 | Caverly | |
| 2017/0174249 A1* | 6/2017 | Stinebring | B62D 1/181 |
| 2018/0050718 A1 | 2/2018 | Galehr et al. | |
| 2018/0194394 A1 | 7/2018 | Stratmann et al. | |
| 2018/0290680 A1 | 10/2018 | Huber | |
| 2019/0047608 A1* | 2/2019 | Ishikawa | B62D 1/184 |
| 2019/0315386 A1 | 10/2019 | Paltinisanu et al. | |
| 2019/0329814 A1 | 10/2019 | Raich | |
| 2020/0039580 A1 | 2/2020 | Redeker et al. | |
| 2021/0213998 A1* | 7/2021 | Kurokawa | B62D 1/185 |

FOREIGN PATENT DOCUMENTS

| | | | | | |
|---|---|---|---|---|---|
| CN | 201484480 U | | 5/2010 | | |
| CN | 101987632 A | | 3/2011 | | |
| CN | 102009683 A | | 4/2011 | | |
| CN | 110191834 A | | 8/2019 | | |
| DE | 4408747 A1 | | 9/1994 | | |
| DE | 3732817 A1 | * | 4/1998 | | |
| DE | 10 2006 028 957 A1 | | 12/2007 | | |
| DE | 10 2010 045 423 A1 | | 3/2012 | | |
| DE | 10 2011 084 765 A1 | | 4/2013 | | |
| DE | 10 2013 011 883 A1 | | 1/2015 | | |
| DE | 10 2015 008 587 A1 | | 1/2017 | | |
| DE | 10 2015 212 229 A1 | | 1/2017 | | |
| DE | 10 2016 210 833 A1 | | 12/2017 | | |
| DE | 102016211342 A1 | | 12/2017 | | |
| DE | 10 2016 220 140 A1 | | 4/2018 | | |
| DE | 102016220140 A1 | * | 4/2018 | | B62D 1/184 |
| DE | 102017200888 A1 | * | 7/2018 | | B62D 1/181 |
| DE | 102020203210 A1 | * | 9/2021 | | |
| EP | 3628566 A1 | * | 4/2020 | | B62D 1/183 |
| JP | S61200065 A | | 9/1986 | | |
| JP | 2007269063 A | | 10/2007 | | |
| JP | WO2007083536 A1 | * | 6/2009 | | |
| JP | 2017 001622 A | | 1/2017 | | |
| JP | 2018 039330 A | | 3/2018 | | |
| JP | 2018030539 A | * | 3/2018 | | |
| JP | 2018039330 A | * | 3/2018 | | |
| JP | 2022189046 A | * | 12/2022 | | B62D 1/185 |
| WO | WO-0181149 A2 | * | 11/2001 | | B62D 1/181 |
| WO | 2007009760 A1 | | 1/2007 | | |
| WO | WO-2008072711 A1 | * | 6/2008 | | B62D 1/181 |
| WO | WO-2016004167 A1 | * | 1/2016 | | B62D 1/181 |
| WO | 2016142119 A1 | | 9/2016 | | |
| WO | WO-2017157755 A1 | * | 9/2017 | | B21D 51/02 |
| WO | 2018069339 A1 | | 4/2018 | | |
| WO | WO-2018172275 A1 | * | 9/2018 | | B62D 1/00 |
| WO | WO-2020064796 A1 | | 4/2020 | | B62D 1/181 |
| WO | WO-2021180609 A1 | * | 9/2021 | | |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2021/051545, filed Jan. 25, 2021, which claims priority to German Patent Application No. DE 10 2020 201 058.7, filed Jan. 29, 2020, the entire contents of which are incorporated herein by reference.

FIELD

The present disclosure generally relates to steering columns, including steering columns for motor vehicles.

BACKGROUND

The steering column of a motor vehicle comprises a steering spindle, on the rear end of which in the direction of travel, on the driver's side, a steering wheel is attached for the input of manual steering commands. The steering spindle is mounted so as to be rotatable about its longitudinal axis in a casing tube, which is also described as an inner tube or inner casing tube. In order to allow a length adjustment of the steering wheel for adaptation to the driver's position, a generic, electrically adjustable steering column comprises a casing unit which can be adjusted via an electromotor adjustment drive, wherein the casing tube is received so as to be axially telescopically adjustable in the longitudinal direction, i.e. in the direction of the longitudinal axis, in a guide unit also known as a guide box, outer casing or outer casing tube. The casing unit is held by a carrier unit which is connected to the body of the motor vehicle.

In the prior art, DE 10 2017 200 888 A1 discloses an electrically adjustable steering column with a guide unit having a longitudinal passage in which the casing tube is received so as to be telescopically adjustable in the longitudinal direction, and an electric motor adjustment drive is arranged between the casing tube and the guide unit. An inner bearing face formed on the inside of the longitudinal passage surrounds an outer casing surface of the casing tube from the outside, wherein the bearing face encloses the casing surface at least over a partial region of the circumference, whereby the casing tube is guided slidingly in the longitudinal direction.

In order to allow a length adjustment and at the same time ensure adequate stiffness of the steering column, the above-mentioned DE 10 2017 200 888 A1 describes applying a defined preload force via a preload device, by means of which the bearing face is pressed radially against the casing surface. This preload force is set or calibrated once during assembly of the steering column and cannot be changed during operation. For this, the guide unit has a slot which extends as a longitudinal slot at least partially in the longitudinal direction, and has an adjustable slot width between its mutually opposing slot edges or sides which face one another in the circumferential direction. To adjust the slot width, a tightening force can be applied by means of the preload device, by means of which the slot edges are loaded towards one another in the circumferential direction and pulled together, the aim being to reduce the slot width. In this way, the guide unit in the manner of a clamping clip can be preloaded together with the casing tube, wherein the peripheral bearing face is pressed from the outside against the outer casing surface of the casing tube with a defined radial preload force.

The known arrangement allows an adjustment of the preload force. When the slot width is reduced however, on tightening, friction forces also act in the circumferential direction between the bearing face and the casing surface and are superposed over the actual radial preload. This hinders a precise and fine adjustment and, usually, in order to guarantee adequate stiffness, a higher preload force is set, which can lead to greater wear.

Thus a need exists to be able to specify the preload force better and more precisely, and reduce wear during adjustment.

DETAILED DESCRIPTION

Figure 1:
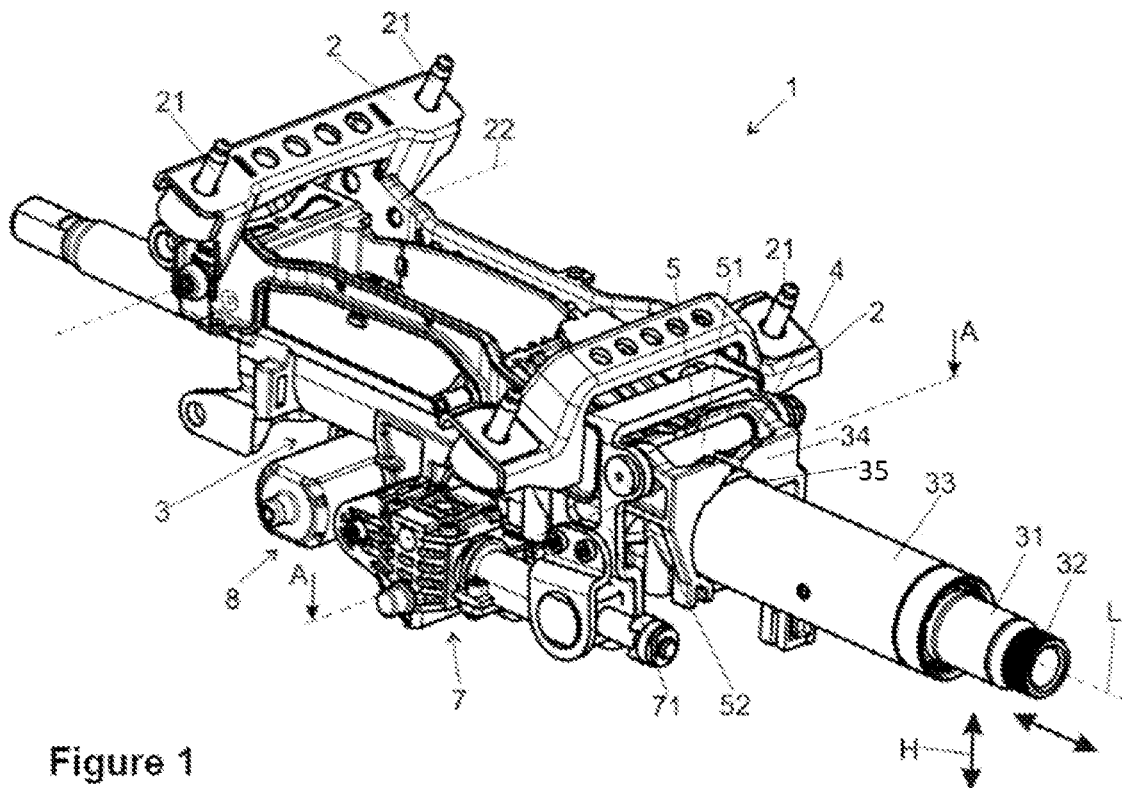
FIG. 1 is a schematic, perspective view of an example electrically adjustable steering column according to the present disclosure.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally concerns an electrically adjustable steering column for a motor vehicle. In some examples, such an electrically adjustable steering column may comprise a casing tube in which a steering spindle is mounted so as to be rotatable about its longitudinal axis, and which is received so as to be telescopically adjustable in the direction of the longitudinal axis in a guide unit which can be connected to a body of a motor vehicle, and an electromotor adjustment drive that is arranged between the casing tube and the guide unit. An inner bearing face of the guide unit surrounds an outer casing surface of the casing tube and has a slot which extends in the direction of the longitudinal axis and has a slot width between its mutually opposing slot edges, and on which engages a preload device able to apply a tightening force acting to reduce the slot width in order to preload the bearing face together with the casing surface.

In an electrically adjustable steering column for a motor vehicle, comprising a casing tube in which a steering spindle is mounted so as to be rotatable about its longitudinal axis, and which is received so as to be telescopically adjustable in the direction of the longitudinal axis in a guide unit which can be connected to a body of a motor vehicle, and an electromotor adjustment drive which is arranged between the casing tube and the guide unit, wherein an inner bearing face of the guide unit surrounds an outer casing surface of the casing tube, and has a slot which extends in the direction of the longitudinal axis and has a slot width between its mutually opposing slot edges in the circumferential direction, and on which engages a preload device able to apply a tightening force acting to reduce the slot width in order to preload the bearing face together with the casing surface, according to the invention it is provided that a clamping body cooperates with the slot edges via a deflection device which converts a reduction of the slot width into a radial clamping movement of the clamping body for radial preloading against the outer casing surface of the casing tube.

In the invention, a reduction of the slot width is converted via a deflection device into a radially inwardly directed clamping movement of a clamping body. Here, the tightening force, which is applied to the guide unit by the preload device in the circumferential direction in order to reduce the slot width, is deflected by the deflection device into a clamping force acting radially on the clamping body. The clamping body is supported outwardly and in the longitudinal direction against the guide unit, and is pressed radially against the casing tube by the clamping force.

The deflection device according to the invention allows the targeted generation and control of the clamping or preload force, by means of which the casing tube is clamped between the clamping body according to the invention and the bearing face which lies against the casing tube outside the clamping body. As a result, on generation of the preload force for calibrating the steering column, it is possible to decouple the force components acting in the radial and circumferential directions so that the above-described disadvantages of the prior art can be avoided. It is advantageous that the preload force exerted on the casing tube can be specified more precisely and a fine adjustment is possible, so that the active displacement force, or the friction force acting between the casing tube and the guide unit during adjustment, can be set more precisely than in the prior art. The result is a reduced wear between the casing tube and the guide unit during adjustment and a longer service life.

It may be provided that the preload device is unchangeably and permanently fixed. Thus, during assembly of the steering column, the preload force is set once by means of the preload device and then remains unchangeably and permanently fixed, wherein during operation of the steering column, the preload device remains in an unchanged setting. The preload device is adjusted exclusively by calibration of the steering column during assembly. In other words, in normal operation, during adjustment by means of the adjustment drive, the preload device remains in the same position as in a rest state in which no adjustment takes place, and the casing tube is in unchanged position relative to the guide unit. It is not provided that the preload device is operated by the vehicle driver. Particularly preferably, the preload device is inseparably and permanently fixed. The permanent fixing may be achieved by substance bonding, by force fit and/or by form fit, for example by gluing, pressing or similar, whereby adjustment means for changing the slot width are fixed in the single established setting.

Preferably, the slot edges lie opposite one another in the circumferential direction, so that the tightening force acting to reduce the slot width acts in the circumferential direction.

By the design of the deflection device, a defined force-travel characteristic can be predefined, which is fixedly specified in the prior art by the force translation ratio between the change in slot width and the bearing face lying on the casing tube over the circumferential region. The deflection device may allow a linear conversion of the tightening force generated by the preload device into the preload force exerted by the clamping body on the casing tube.

The clamping body, which may also be described as a press body, may preferably be formed separately from the guide unit and brought into active engagement during assembly of the deflection device. In this way, the clamping body and the guide unit may comprise different materials independently of one another, and may be optimized with respect to different loading and function. For example, different metallic materials, plastics and/or material combinations may be used, for example to create a defined friction. In this way, for example, a low-loss force translation in the deflection device may be achieved, and/or a low-play and simultaneously easily adjustable sliding guidance of the casing tube in the guide unit. Because of the separate construction, furthermore a flexible adaptation to special requirements, for example with respect to different transmission characteristics and/or dimensions within the steering column, may be achieved at low cost.

Alternatively, it is also possible to construct the clamping body integrally with the guide unit or casing tube. For example, a separable or permanent connection may be provided for adaptation to an installation space or other specific peripheral conditions which do not require the flexibility of a separate construction.

Preferably, it may be provided that the clamping body is arranged in the region of the slot between the slot edges and the outer casing surface of the casing tube. In the prior art, a clear space exists between the slot edges and the outside of the casing tube, in which a clamping body according to the invention may be arranged. One advantage here is that the improved functionality of the invention can be implemented within a given existing installation space, whereby the function of the steering column can be improved without changing the other peripheral conditions. A further advantage is that, by arranging the clamping body inside the free circumferential region between the slot edges of the prior art, the stiffness of the clamping connection and hence the steering column can be increased.

It may be provided that the clamping body has a control face which cooperates with a corresponding control face formed on the guide unit. The deflection device may thereby be configured as a wedge guide, a sliding block guide or a curve guide, wherein the control faces on the clamping body and on the guide unit can slide on one another and are formed such that they convert a relative movement in the circumferential direction between the clamping body and the slot edge into a relative movement with at least one radial movement component. Such a curve gear or sliding block guide can be implemented at low cost by simple shaping of the slot or slot edges and the clamping body, wherein the force and/or travel translation ratio can be predefined by a corresponding curved design of the control faces. Because no additional gear elements are required, a compact and reliable construction is possible with simple production and assembly.

In an advantageous refinement of the above-mentioned embodiment, a control face of the clamping body or the guide unit has at least one wedge face which slopes against the circumferential direction and runs parallel to the longitudinal axis, and which contacts a corresponding support face on the guide unit or on the clamping body. A wedge face may for example be arranged on one or both slot edges, so that at least one support face of the clamping body lying thereon moves, preferably slides, along the control face during a relative movement in the circumferential direction because of a reduction in the slot width. Also a reversed arrangement of the wedge face on the clamping body and support face on one or both of the slot edges is possible. It is also possible that the support face is also formed as a wedge face, so that the deflection device acts as a wedge guide or wedge gear with corresponding, mutually contacting, movable wedge faces which slide on one another and have substantially the same slope. The wedge face may be formed flat with an even, continuous slope, whereby a linear translation can be achieved.

In an advantageous refinement, it may be provided that the clamping body comprises two wedge faces which are arranged mirror-symmetrically with respect to a longitudinal plane and run together radially towards the outside, and which are arranged between corresponding support faces on the guide unit. The wedge faces on the clamping body may preferably be formed flat and run together radially towards the outside, sloping against one another, so that in other words, a type of prism or ridge-like design with a radially outwardly facing tip is formed. The tip may be rounded and need not run up to a sharp edge. The corresponding support faces in the slot may be formed parallel to the wedge faces and be arranged such that in cross-section, the slot runs together in a V-shape directed radially towards the outside. On a reduction in slot width by means of the tightening device, the wedge faces slide radially obliquely inward, corresponding to the slope, with respect to the support faces, so that the clamping body executes a clamping movement directed radially inward. The translation ratio between the relative movement of the wedge faces at the slot edges in the circumferential direction and the radial clamping movement of the clamping body may easily be specified by the slope of the wedge faces, wherein for a given reduction of the slot width, a relatively obtuse tip angle of the tip causes a small radial clamping movement with relatively large clamping force, and a relatively acute tip angle causes a relatively large clamping movement with lower clamping force. It is advantageous that a prismatic or ridge-like clamping body can be produced at low cost and is easy to install. A secure and precise radial guidance of the clamping movement of the clamping body between the symmetrical wedge faces, and hence a reliable function, is guaranteed.

Preferably, the clamping body has a slide face directed radially against the casing surface. The preload force generated by the deflection device presses the slide face of the clamping body radially from the outside against the outer casing surface of the casing tube and ensures a low-play and stiff guidance of the casing tube in the guide unit.

In order to reduce the adjustment force necessary for adjustment, the clamping body, preferably in the region of its slide face preloaded against the casing tube, may be configured so as to reduce friction, for example by means of surface coating or structuring.

It may be provided that the clamping body has a lubrication pocket. Such a lubrication pocket may be designed to provide a lubricant retention volume by means of a depression or recess which may be formed in a slide face and can be filled with a store of grease. In this way, a low-maintenance, long-term lubrication can be achieved. A lubricant pocket may be arranged for example in a slide face lying against the casing tube in order to allow easy adjustment. A lubricant pocket may also be provided in a control face or wedge face in order to reduce the friction in the deflection device.

The clamping body may be made at least partially of a plastic. The guide unit and also the casing tube are usually made of a metallic material, normally steel, an aluminum alloy or cast metal. Because the clamping body as a whole, or at least in the region of the control faces and/or clamping faces, is made of plastic such as for example polyamide (PA), polypropylene (PP), polytetrafluoroethylene (PTFE) or similar, the friction in the deflection device and/or between the casing tube and clamping body or guide unit can be reduced and optimized.

The clamping body is preferably supported on the guide unit in the direction of the longitudinal axis. In this way, the clamping body is fixed in the longitudinal direction relative to the guide unit, and in the fixed position, because of the force-fit connection, allows fixing of the casing tube in the longitudinal direction. In the region of the gap, the clamping body is preferably also supported in the circumferential direction, for example between the above-described wedge faces or support faces at the slot edges. When switching between the release and fixing positions, the clamping body can then preferably execute only a force-guided clamping movement in the radial direction relative to the guide unit.

It may be provided that the preload device has a tightening bolt which extends over the slot transversely to the longitudinal axis and acts on the guide unit in the circumferential direction in the region of the slot edges. The tightening bolt may for example be configured as a threaded bolt which passes through the guide unit transversely to the slot, and rests with a bolt head on the outside of one slot edge and with a screwed nut on the outside of the other opposite slot edge. In this way, by tightening the nut, the slot width may be reduced in order to set the preload force.

In the above embodiment, it may be advantageous that the clamping body is supported on the tightening bolt in the direction of the longitudinal axis. This may be achieved in that the tightening bolt extends transversely through a cutout or opening of the clamping body and also through a cutout or opening in the guide unit, so that a form-fit connection active in the longitudinal direction is formed between the guide unit and the clamping body. The compact design of the support in the longitudinal direction is advantageous, as is the possibility of simple and secure mounting.

The motorized length adjustment preferably comprises an electric motor adjustment drive which acts between the casing tube and the guide unit and allows a relative telescopic adjustment. Such an adjustment drive may be configured in the known fashion as a spindle drive, in which a spindle nut and threaded spindle engaging therein can be driven in rotation relative to one another by an electric motor, whereby a linear adjustment in the direction of the spindle axis can be achieved. Because the preload can be specified more precisely by the invention, the slide friction between the guide unit and the casing tube, and hence the necessary adjustment force, can be set better and more precisely, so that the necessary drive power of the adjustment drive can be optimized and said drive may be dimensioned correspondingly smaller and lighter than in the prior art.

In addition, the guide unit may be held on the carrier unit so as to be fixable and adjustable in the vertical direction. In this way, a height adjustment of the casing unit and hence of the steering wheel may take place. An electric motor adjustment drive may also be provided for this.

FIG. 1 shows a schematic, perspective view of an electrically adjustable steering column 1 in the installation position, obliquely from the rear onto the left-hand side in the direction of travel.

The steering column comprises a carrier unit 2 with connecting means 21 in the form of bolts for mounting to a body (not shown) of a motor vehicle.

The carrier unit 2 holds a casing unit 3 comprising a steering spindle 31 which, at its rear end in the direction of travel, has a fixing portion 32 for attachment of a steering wheel (not shown), and which is mounted in a casing tube 33 so as to be rotatable about a longitudinal axis L. The casing tube 33 is received in a longitudinal opening 35 so as to be telescopically adjustable in the longitudinal direction, i.e. in the direction of the longitudinal axis L, as indicated by the double arrow.

The guide unit 34 is mounted on the carrier unit 2 in the front region, so as to be pivotable about a vertical pivot axis 22 lying horizontally and transversely to the longitudinal axis L, whereby the casing unit 3 can be adjusted up and down in a vertical direction H relative to the carrier unit 2 for height adjustment of the steering wheel, as indicated by the double arrow.

Figure 4:
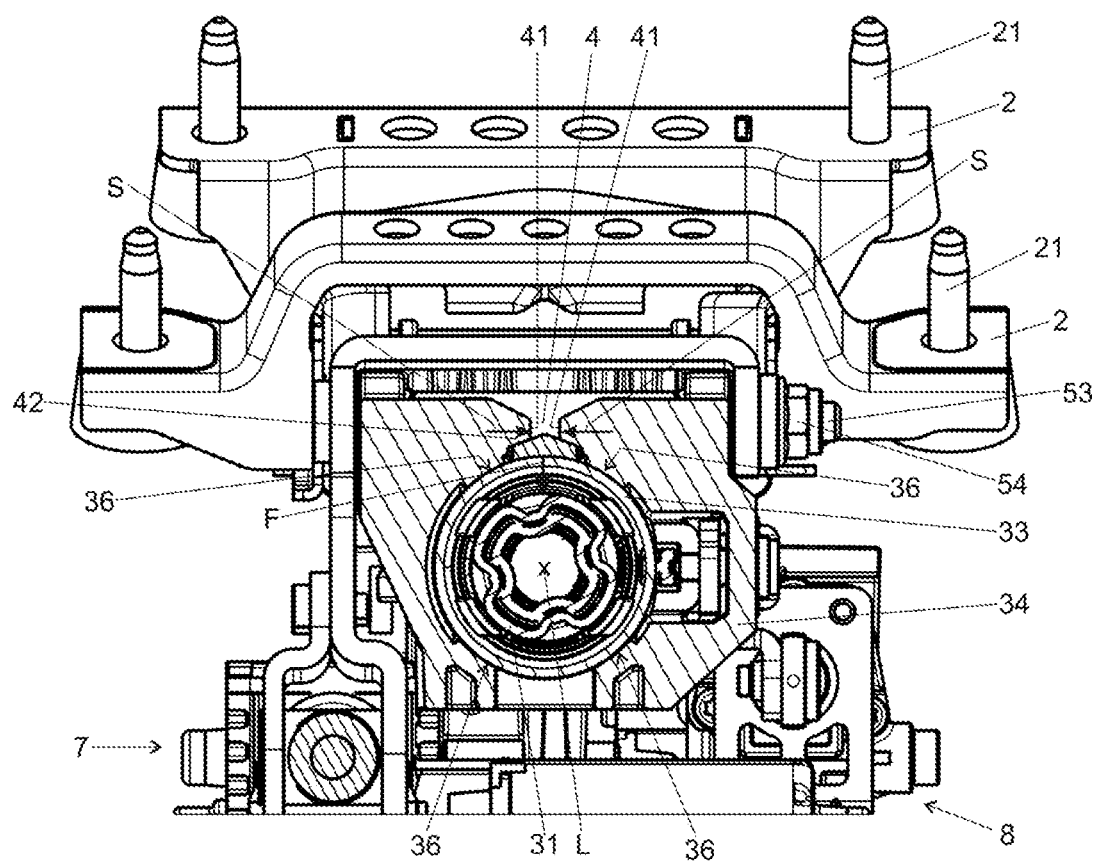
FIG. 4 is a cross-sectional view through the steering column from FIG. 1.

In the cross-sectional view A-A from FIG. 1 shown in FIG. 4, it is evident how the casing tube 33 is held coaxially in the opening cross-section of the longitudinal passage 35. The guide unit 34 here surrounds the casing tube 33 with radially inwardly directed bearing faces 36, which each extend over a circumferential region in the longitudinal passage 35 and, in the example illustrated, are divided into several radially inwardly protruding, circumferential portions. The bearing faces 36 lie on the outside of the outer casing surface of the casing tube 33 so as to slide in the longitudinal direction.

The guide unit 34 has a slot 4 running in the longitudinal direction, with a slot width which extends between two mutually opposing slot edges 41 in the circumferential direction.

Figure 2:
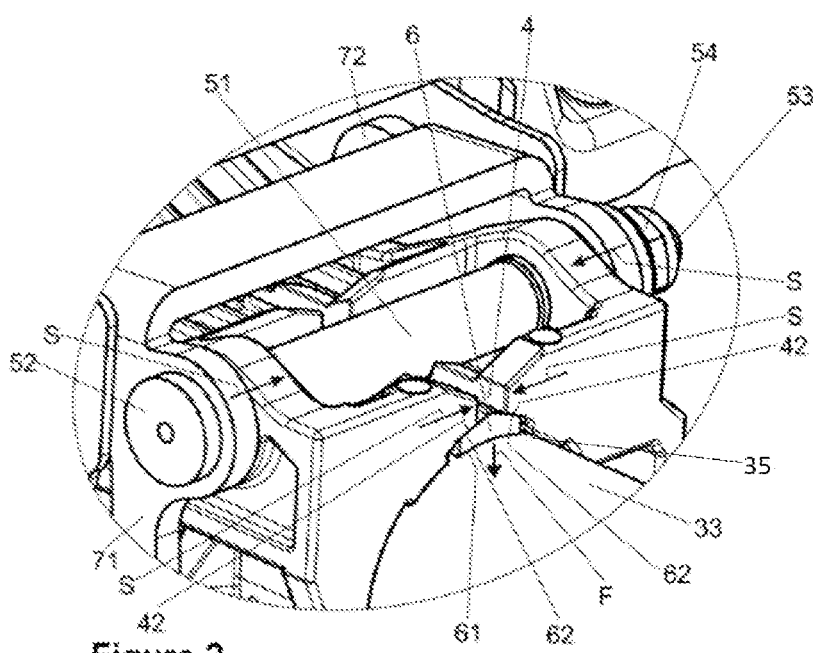
FIG. 2 an enlarged, detail view of the steering column from FIG. 1.

A preload device 5 comprises a tightening bolt 51 which is configured as a threaded bolt with a bolt head 52 and a threaded portion 53 on which a nut 54 is screwed. The tightening bolt 51 passes through the guide unit 34 transversely to the longitudinal axis L and extends over the slot 4. Because the bolt head 52 rests on the outside of the guide unit 34 relative to the one slot edge 41, and the nut 54 rests on the outside of the guide unit 34 on the opposite side relative to the other slot edge 41, the two slot edges 41 can be moved towards one another in the circumferential direction with a tightening force S by tightening the nut 54, as shown in FIG. 4 and the enlarged detail view of FIG. 2. In this way, the slot width of the slot 4 can be set by adjustment of the nut 54.

A clamping body 6 according to the invention is arranged in the region of the slot 4. A radially inwardly facing slide face 61 of this body rests on the outer casing surface of the casing tube 34.

The slide face 61 of the clamping body may be provided with a friction-reducing coating, for example a slip paint.

The clamping body 6 has a prismatic or ridge-like cross-section which has two wedge faces 62 sloping towards one another, which run together radially towards the outside. The two wedge faces 62 are arranged mirror-symmetrically with respect to a longitudinal plane containing the longitudinal axis L, and extend in the longitudinal direction parallel to the longitudinal axis L.

The wedge faces 62 bring the clamping body 6 into sliding contact with corresponding support faces 42, which are formed on the inside of the guide unit 34 on both sides of the slot 4 in the region of the slot edges 41.

The wedge faces 62 together with the support faces 42 form a deflection device according to the invention, namely a wedge or curve gear, which may also be described as a wedge or curve guide. A reduction in slot width in the circumferential direction is converted into a radially inwardly directed clamping movement via the sloping support faces 42 and wedge faces 52, whereby the sliding face 61 of the clamping body 6 is preloaded with a preload force F radially from the outside against the outer casing surface of the casing tube 33.

By screwing the nut 54 onto the tightening bolt 51, the tightening force S for reducing the slot width may be set, whereby the preload force F exerted on the casing tube 33 by the clamping body 6 can be finely adjusted. In this way, the bearing play of the sliding guide between the casing tube 33 and the bearing faces 36 of the guide unit 34 and clamping body 6 can easily be optimally set.

It may be provided that the nut 54 and the tightening bolt 51 are inseparably connected together. This may be achieved for example by means of a substance-bonded connection such as welding or gluing, or by plastic deformation by means of a caulking operation or similar.

Figure 5:
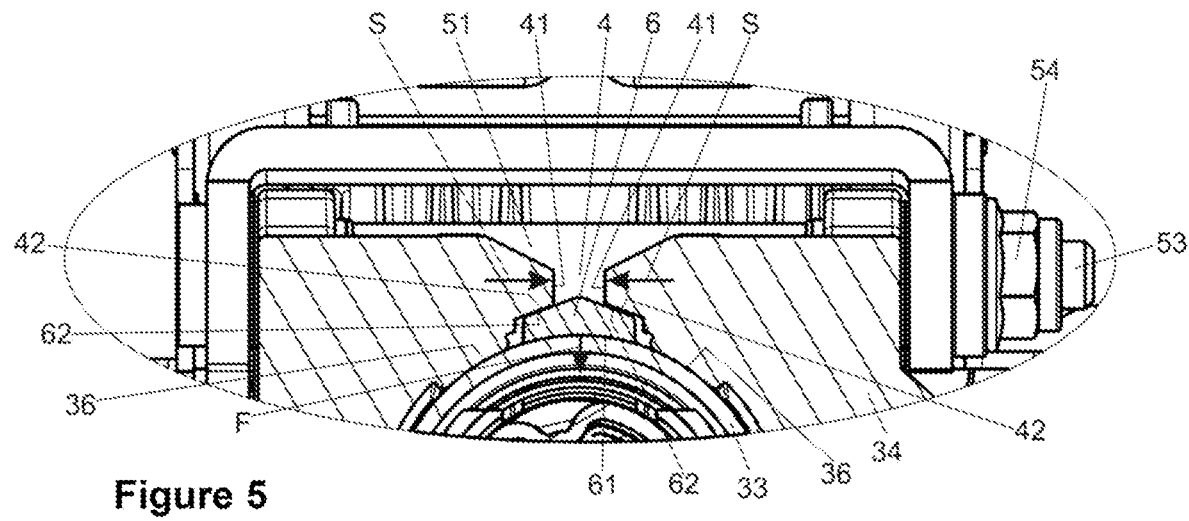
FIG. 5 is an enlarged, detail view of the cross-section from FIG. 4 in a first embodiment.
Figure 6:
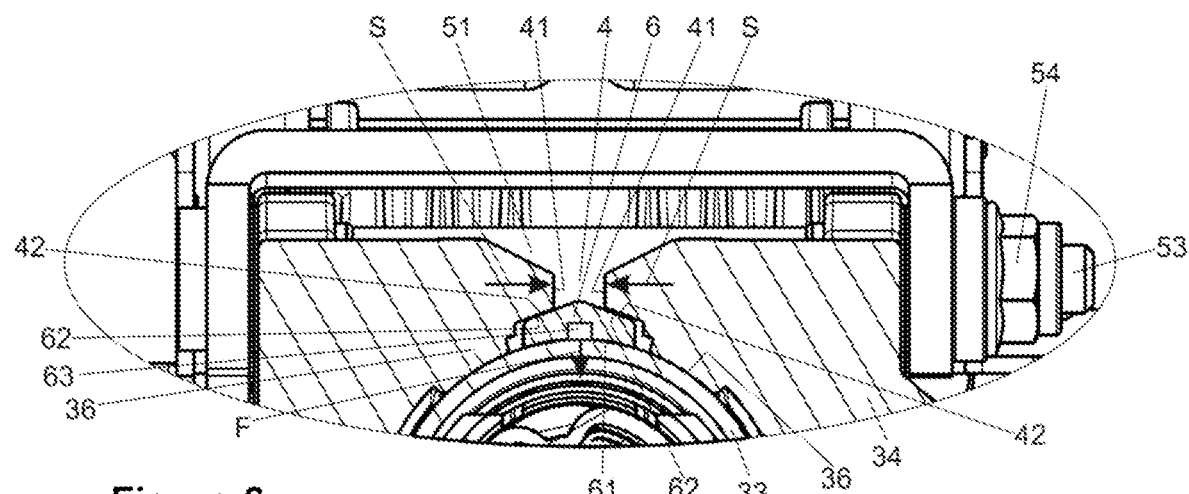
FIG. 6 is an enlarged, detail view of the cross-section from FIG. 4 in a second embodiment.

FIG. 5 shows an enlarged, part view of the cross-section from FIG. 4 in which the arrangement of the clamping body 6 is clearly evident. FIG. 6 shows a similar view of a refinement in which a lubrication pocket 63 is formed as a depression in the region of the sliding face 61, and can be filled with grease for long-term lubrication.

The length adjustment by telescopically retracting or extending the casing tube 33 relative to the guide unit 34 takes place by means of an electric motor length adjustment drive 8, which may be configured in the known fashion as a spindle drive which is integrated or arranged between the casing tube 33 and the guide unit 34 in the longitudinal direction.

Figure 3:
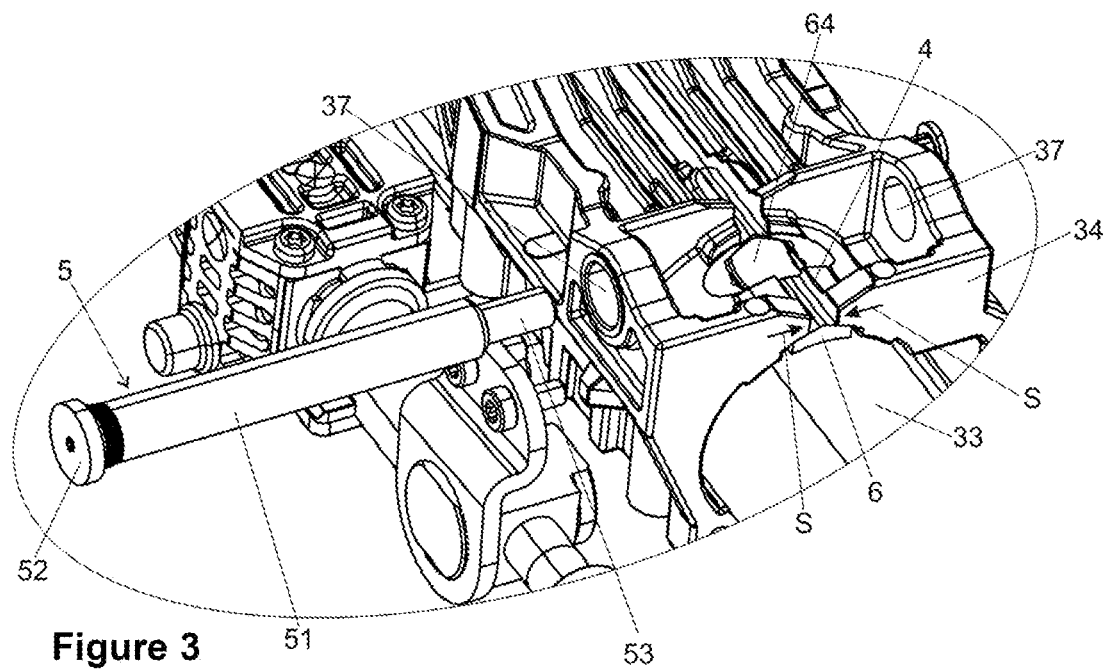
FIG. 3 is a detail view similar to FIG. 2, in partially exploded illustration.

For support on the guide unit 34 in the longitudinal direction, the clamping body 6 on its top side has a form-fit cutout 64 which can be seen in the illustration of FIG. 3, in which the tightening bolt 51 is shown removed. For mounting, the tightening bolt 51 is passed through the openings 37 formed on the guide unit 34 on both sides of the slot 4, and thus engages in the form-fit cutout 64 in order to form a form fit acting in the longitudinal direction. Optionally, flanged sleeves may be arranged in the openings 37, wherein preferably the flanged sleeves are made of a non-ferrous metal such as brass. Thus the clamping body 6 is held on the guide unit 34 by form fit in the longitudinal direction.

For height adjustment, an electric motor adjustment drive 7 is provided, formed as a spindle drive which rests on the guide unit 34 and acts on an adjustment lever 71 which is itself mounted on the guide unit 34 so as to be rotatable around the tightening bolt 51. A lever end 72 of the adjustment lever 71 is hinge-mounted on the carrier unit 2. In this way, a pivoting of the adjustment lever 71 by means of the adjustment drive 7 causes a height adjustment by pivoting the casing unit 3 about the vertical pivot axis 22.

In an embodiment not shown, it may be provided that the adjustment lever 71 is rotatably mounted on the guide unit 34 by means of a hinge axis, wherein the tightening bolt 51 is not formed by the hinge axis. It is furthermore pointed out that a height adjustment is not essential to the invention, and the teaching of the invention can also be implemented with a steering column which is purely length-adjustable.

LIST OF REFERENCE SIGNS

1 Steering column
2 Carrier unit
21 Connecting means
3 Casing unit
31 Steering spindle
32 Fixing portion
33 Casing tube
34 Guide unit
35 Longitudinal passage
36 Bearing faces
37 Openings
4 Slot
41 Slot edge
42 Support faces
5 Preload device
51 Tightening bolt
52 Bolt head
53 Threaded portion
54 Nut
6 Clamping body
61 Slide face
62 Wedge faces
63 Lubrication pocket
64 Form-fit cutout
L Longitudinal axis
S Tightening force
F Preload force

What is claimed is:

1. An electrically adjustable steering column for a motor vehicle, comprising:
a casing tube in which a steering spindle is mounted so as to be rotatable about a longitudinal axis;
a guide unit that is connectable to a body of the motor vehicle, wherein the casing tube is received in the guide unit so as to be telescopically adjustable in a direction of the longitudinal axis, wherein an inner bearing face of the guide unit surrounds an outer casing surface of the casing tube and has a slot that extends in the direction of the longitudinal axis and that has a slot width between mutually opposing slot edges;
an electromotor adjustment drive disposed between the casing tube and the guide unit;
a preload device that engages the mutually opposing slot edges of the slot and is configured to apply a tightening force to reduce the slot width to preload the inner bearing face together with the outer casing surface, wherein the preload device is fixed in place whereby the slot width is fixed to a singular setting; and
a clamping body that cooperates with the slot edges via a deflection device that converts a reduction of the slot width into a radial clamping movement of the clamping body for radial preloading the outer casing surface of the casing tube.

2. The electrically adjustable steering column of claim 1 wherein the clamping body is disposed in a region of the slot between the slot edges and the outer casing surface of the casing tube.

3. The electrically adjustable steering column of claim 1 wherein the clamping body includes a first control face that cooperates with and corresponds to a second control face on the guide unit.

4. The electrically adjustable steering column of claim 3 wherein the first or second control face includes a wedge face that slopes against a circumferential direction and runs parallel to the longitudinal axis, the wedge face contacting a corresponding support face on the guide unit or on the clamping body.

5. The electrically adjustable steering column of claim 3 wherein the clamping body comprises two wedge faces that are arranged mirror-symmetrically with respect to a longitudinal plane and extend together radially towards an outside, wherein the two wedge faces are disposed between corresponding support faces on the guide unit.

6. The electrically adjustable steering column of claim 1 wherein the clamping body includes a slide face directed radially against the outer casing surface.

7. The electrically adjustable steering column of claim 1 wherein the clamping body includes a lubrication pocket.

8. The electrically adjustable steering column of claim 1 wherein the clamping body is comprised of plastic.

9. The electrically adjustable steering column of claim 1 wherein the clamping body is supported on the guide unit in the direction of the longitudinal axis.

10. The electrically adjustable steering column of claim 1 wherein the preload device includes a tightening bolt that extends over the slot transversely to the longitudinal axis and acts in a circumferential direction in a region of the slot edges.

11. The electrically adjustable steering column of claim 1 wherein the clamping body is supported on a tightening bolt in the direction of the longitudinal axis.

12. The electrically adjustable steering column of claim 1, wherein the preload device is fixed in place substance bonding, force fit, or form fit.

* * * * *